United States Patent
Smith et al.

(10) Patent No.: US 7,831,246 B1
(45) Date of Patent: Nov. 9, 2010

(54) MOBILE MERCHANT

(75) Inventors: Michael Alton Smith, Atlanta, GA (US); Max Glenn Faulkner, Roswell, GA (US); Charles M. Link, II, Atlanta, GA (US); Reginald Squirrell, Marietta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 796 days.

(21) Appl. No.: 11/608,660

(22) Filed: Dec. 8, 2006

(51) Int. Cl.
*H04M 3/00* (2006.01)

(52) U.S. Cl. .................. 455/420; 455/408; 455/432.3; 705/44

(58) Field of Classification Search ........... 455/406, 455/408, 414.1, 419, 420, 432.1, 432.3; 705/39, 705/44, 77
See application file for complete search history.

(56) References Cited

U.S. PATENT DOCUMENTS

| | | | |
|---|---|---|---|
| 6,363,357 B1 | 3/2002 | Rosenberg et al. | |
| 7,229,013 B2 | 6/2007 | Ben-Aissa | |
| 2001/0049660 A1 | 12/2001 | Coventry | |
| 2002/0191816 A1 | 12/2002 | Maritzen et al. | |
| 2003/0200184 A1* | 10/2003 | Dominguez et al. | 705/78 |
| 2004/0087339 A1 | 5/2004 | Goldthwaite et al. | |
| 2004/0097217 A1 | 5/2004 | McClain | |
| 2004/0103060 A1 | 5/2004 | Foth et al. | |
| 2004/0143545 A1* | 7/2004 | Kulakowski | 705/39 |
| 2006/0253392 A1 | 11/2006 | Davies | |

OTHER PUBLICATIONS

OA dated Mar. 16, 2009 for U.S. Appl. No. 11/626,763, 25 pages.
Mobipay. Take your Mobile and Pay. 2002. www.mobipay.com/en/home.htm.
OA dated Mar. 16, 2009 for U.S. Appl. No. 11/626,763, 25 pages.
OA dated Apr. 29, 2009 for U.S. Appl. No. 11/626,763, 18 pages.

* cited by examiner

*Primary Examiner*—Nhan Le
(74) *Attorney, Agent, or Firm*—Turocy & Watson, LLP

(57) ABSTRACT

A mobile merchant service allows payment information, credit information, or other transaction information to be processed utilizing a mobile user device. The information can be transmitted utilizing USSD technology that provides a session oriented transaction. Information relating to the customer payment or account details are not maintained in the user device, providing security of personal information. The user device can be synchronized with other devices to facilitate reconciliation and performing financial or other functions.

14 Claims, 10 Drawing Sheets

MOBILE MERCHANT

BACKGROUND

The mobile telephone industry has been associated with tremendous growth over the last several years. Until recently, mobile telephones were only available to those of highest economic status due to service costs and costs associated with mobile phones. Moreover, network coverage was not extensive enough to enable robust service and only areas associated with dense population were provided with extensive wireless network coverage. The mobile phones that could utilize the networks to communicate were bulky, causing transportation of the phone over any significant distance to be difficult at best.

In contrast, today's mobile devices (e.g., mobile phones, personal digital assistants (PDAs), other suitable user equipment for communication, and so forth) can be utilized as full-service computing mechanisms. For example, many of the most recent and advanced mobile devices can be associated with word processing software, web browsing software, electronic mail software, accounting software, and various other types of software. Moreover, mobile devices can be utilized as cameras, video cameras, audio recorders, and the like. Additionally, mobile devices have decreased in both size and cost and modern mobile devices are often small enough to slip into an individual's pocket without discomfort. Furthermore, network coverage has expanded to cover millions, if not billions, of users and many mobile network service providers offer phones and/or disparate devices at extremely low cost to customers who contract for service with such providers.

Many individuals have access to a personal mobile device no matter where that individual may be located (e.g., at home, in the office, while traveling, at a store, and so forth). For those individuals that sell a product, service, or other item, additional equipment must be on hand to complete a sale. Such equipment includes forms and other paperwork to capture payment information (e.g., credit card number), writing devices, credit card reader, and so forth. In addition, the individual might be required to have enough cash on hand to provide change to those customers who are paying by cash. However, there is no mechanism in place to allow an individual who is receiving payment to capture the necessary payment information while utilizing the minimum amount of equipment and without requiring such individual to carry around large sums of cash.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts in a simplified form as a prelude to the more detailed description that is presented later.

In accordance with one or more embodiments and corresponding disclosure thereof, various aspects are described in connection with allowing a merchant or other mobile device user to receive payment, issue a refund, or perform another transaction, when a product, service, or other exchange occurs. The payment (and similar transactions, such as credits or refunds) can be processed through unstructured supplementary service data (USSD) technology without requiring extra hardware or special client software to be installed on the user device. The disclosed embodiments provide cost effective ways to conduct sales and receive payment in a timely and secure manner (e.g., encrypted transmission of data) without being limited by landline access or additional equipment. Real-time feedback is provided on the transaction request, which can improve sales efficiency and increase successful sales closure rates.

The various embodiments provide a productivity-enhancing tool that can mitigate the paperwork necessary to complete transactions both for the merchant and the administrative staff. This can allow a merchant to dedicate more time to selling a product or service rather than processing payments. The funds can also be transferred in a time-efficient manner, such as overnight or within one or two days (e.g., reducing days outstanding), thus mitigating the lag time generally experienced with processing payment transactions (e.g., credit card transactions).

In accordance with some embodiments, merchants have the ability to process customer payments using a mobile device. The merchant can receive a customer's credit card, for example, and enter the credit card information into the device using various techniques (e.g., keypad, voice recognition, pattern recognition). The information can be processed and sent to a server or database that maintains the customer information. The entered information can be reconciled with the server or database allowing the payment to be applied to the merchant account. A payment authentication code or receipt number can be presented to the merchant, through the user device. Such information can be processed utilizing USSD techniques. In addition, the user device can be synchronized, such as with a laptop computer, allowing the merchant to capture the transactions processed with the device.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
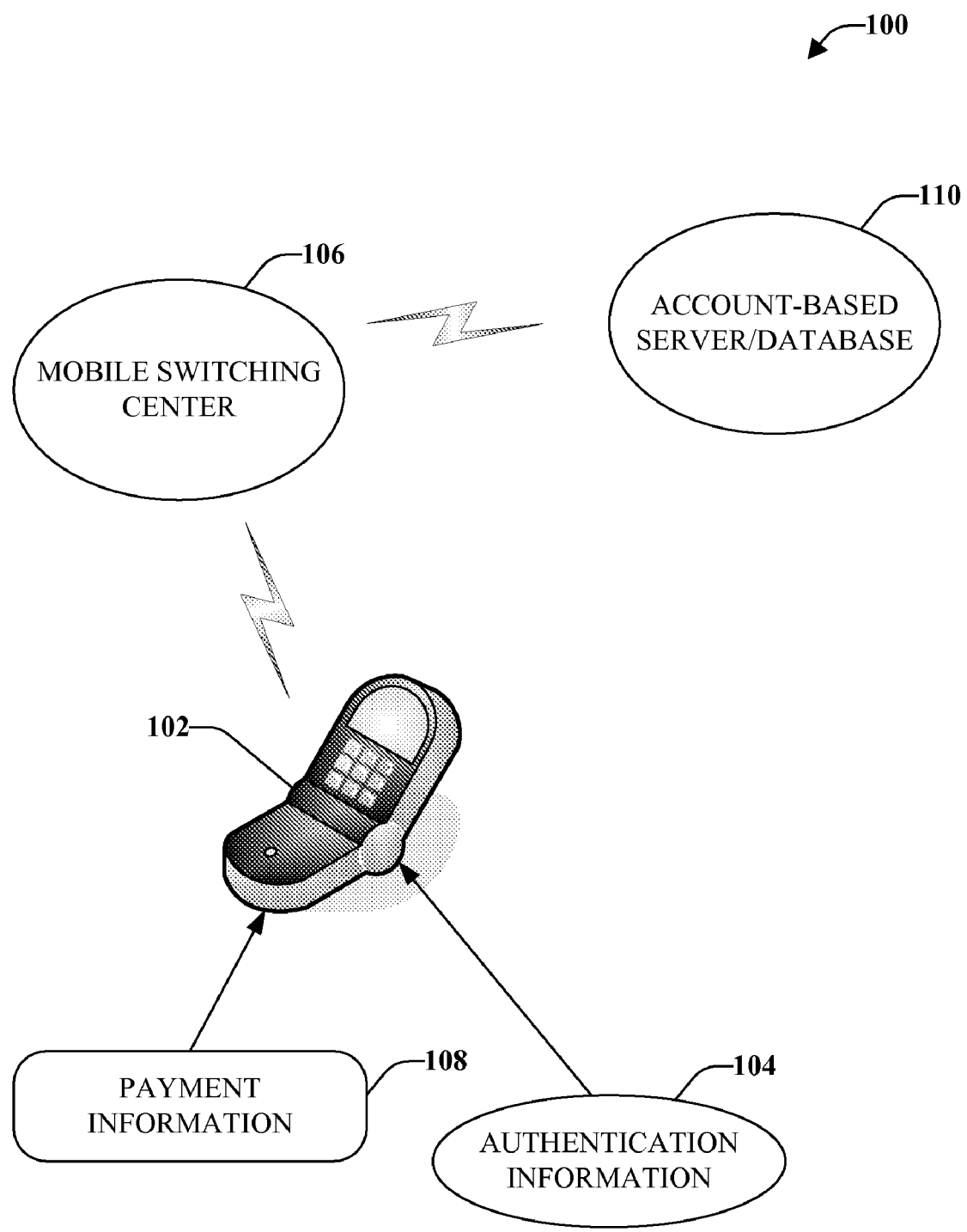
FIG. 1 illustrates an exemplary communications system that can utilize an unstructured supplementary service data (USSD) technology to facilitate payment acceptance with a mobile device.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces.

Referring initially to FIG. 1, illustrated is an exemplary communications system 100 that can utilize an unstructured supplementary service data (USSD) technology to facilitate payment acceptance with a mobile device. The USSD technology allows the user of the mobile device to communicate with other entities (e.g., service provider) in a way that is transparent to the user and the other entities.

System 100 can be powered by a USSD mechanism that offers a high-speed, session oriented, menu driven user experience. Many Global System for Mobile Communications (GSM) devices support USSD. The USSD mechanism can be hosted by a server or database (such as by a subscriber server) that maintains the processing session between the user that is receiving payment and an account or payment database. If the payment database authorizes the transaction, a confirmation code is provided to complete the transaction. The user receiving payment does not need to retain or manually record the payment information (e.g., credit card number, expiration date, owner's signature, and the like) on a sales slip or receipt, thus mitigating the chances of such information being misplaced, stolen, or used for purposes other than the authorized purpose. In some embodiments, the payment transaction can be performed at substantially the same time as a voice call (or other communication exchange) is being conducted with the user device.

A user device, such as a cellular phone 102, can be configured to process a customer payment, such as at a mobile point of sale. It should be understood that although a cellular phone 102 is illustrated, other devices can be utilized with the one or more embodiments disclosed herein. Examples of such devices include smart phones, personal digital assistants (PDAs), computers (desktop and mobile), and other electronic devices both wired and wireless.

The user of the device 102 can be a merchant, salesperson or other person (hereinafter referred to as merchant) that is selling a product, service, or performing another transaction with a customer. Examples of such merchants include persons offering products for sale in a home (or other structure) such as through a home demonstration (e.g., cosmetic sales, home decorating products, and so forth), or providing an in-home service (e.g., plumber, appliance repair technician, cable television installer, and the like). The merchant may be offering for sale various items outside a home or structure or at temporary sites, such as selling tickets to a sporting event, air show, haunted house, art fair, trade show, and so on. It should be appreciated that a merchant can be accepting payment at a variety of places with or without "wired" authorization capability (e.g., local calling area, roaming area, and so on) for a multitude of consumer purchases.

Authentication information 104 can allow the user device 102 to be authenticated with a mobile switching center (MSC) 106 or other authentication server or database. Such authentication allows communication of payment information 108 to an account-based server or database 110. As used herein, an account-based server (database) is a repository of account information (both individual accounts and company accounts) that are processed through the account-based server 110. The accounts can be associated with the account-based server 110 or other entity, provided the account-based server 110 has the capability to access or obtain information regarding such accounts. In some embodiments, the account-based database 110 is a third party merchant that is associated with MSC 106, such as by sharing services. In other embodiments, the functions of the account-based database 110 and MSC 106 are performed by a single server, database, or entity.

At substantially the same time as the MSC 106 authenticates the user device 102, various prompts or menu selections can be presented to the merchant though a display or other means (e.g., audibly) associated with the user device 102. The merchant can respond to the prompts and enter the payment information 108 through interaction with the user device 102. Such payment information 108 can be communicated (e.g., wirelessly or through wired means) to the account-based server or database 110. It should be understood that payment transfers (e.g., payment, credit, and so forth) in accordance with the disclosed embodiments can include debit card payments, credit card payments, bank or money transfers, third-party accounts (e.g., PayPal transactions, or the like) or other forms of payment.

The account-based database 110 can authorize the sale and provide the merchant (though the user device 102) with a confirmation code that can be given to the customer. If the payment is not authorized, the account-based database 110 can notify the merchant who can determine whether the payment information 108 should be resent (e.g., if it was entered incorrectly) or if the transaction should not be allowed to proceed (e.g., the customer does not have sufficient funds to perform the transaction, the customer is not the owner of the account, and so forth). In such a manner, the merchant can receive payment for the various transactions conducted in a timely manner without having to physically retain the customer's payment information in a hard copy form.

In addition, the payment information is maintained only during a current session, providing additional security features. However, enough information can be maintained by the user device 102 to allow the various transactions to be reconciled with an accounts receivable department or other personnel. For example, a merchant can sell a product and receive payment while on the road. Upon returning to the office, the merchant can capture the payments received and send such payment information to an accounting department for reconciliation, commission, or other purposes.

The reconciliation can be performed as part of a synchronization process. For example, information relating to the confirmation codes and transactions can be populated over a network, laptop, desktop, or other device that allows such information to be accessed. For example, a company has many employees that work in the field and collect payment at a customer site. When the employees return to the office or home base, the information can be synchronized with a main billing system. In some embodiments, the information can be synchronized while the employees are remote from the office, such as by uploading the data to a server. This information can also be utilized to track productivity of merchants. Further information regarding the synchronization process will be discussed below.

Figure 2:
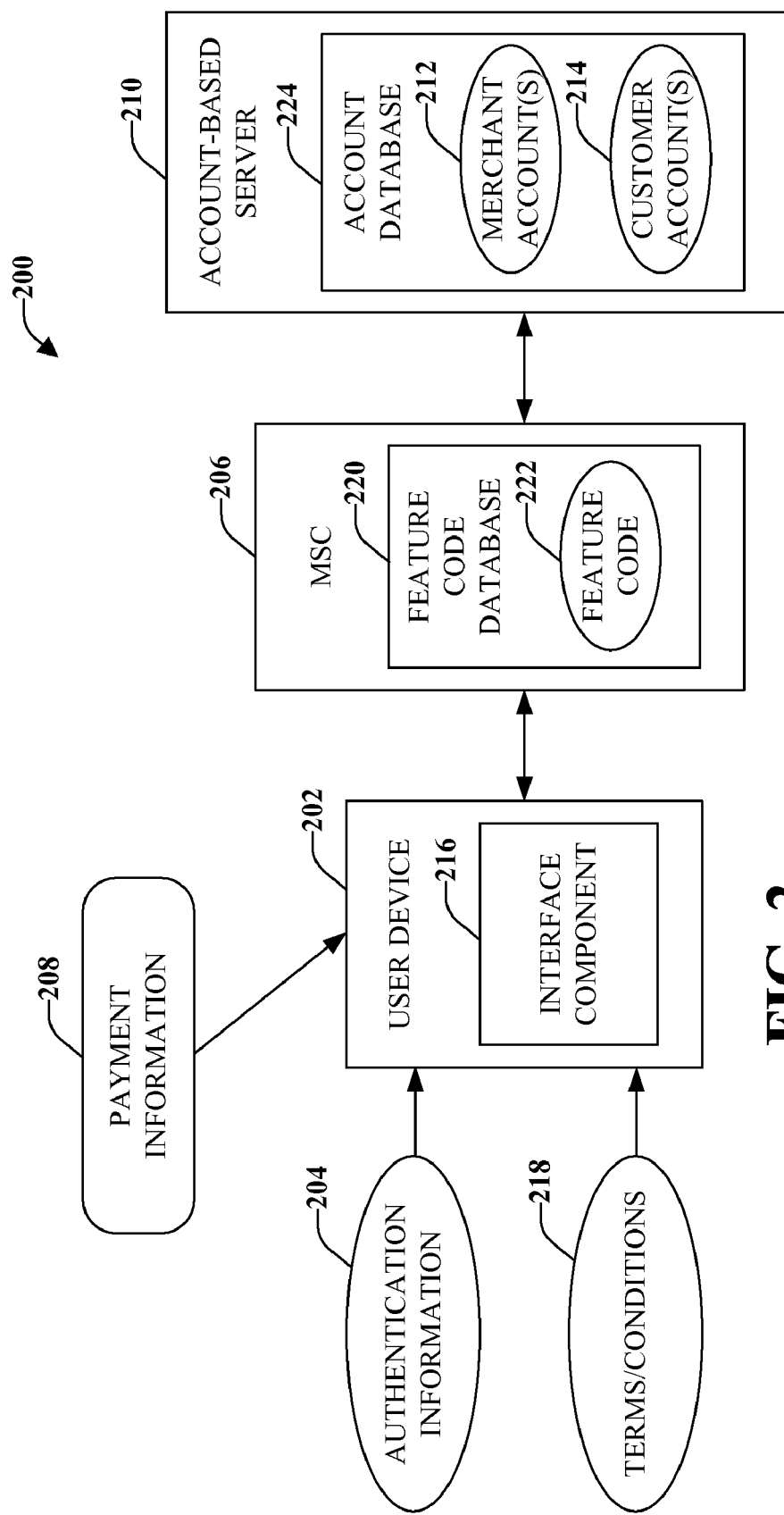
FIG. 2 illustrates a system that facilitates prompt payment verification utilizing USSD technology.

FIG. 2 illustrates a system 200 that facilitates prompt payment verification utilizing USSD technology. System 200 allows a device user (e.g., merchant) to efficiently perform sales transactions in a timely fashion that is convenient to both the merchant and the customer. The sales transaction can be performed utilizing a user device (e.g., mobile phone) without requiring additional components (e.g., credit card reader) or cash transactions.

Included in system 200 is a user device 202 that can be configured to communicate a USSD message that can include merchant authentication information 204 in order to authenticate the user device 202 (e.g., merchant) with a MSC 206. The merchant can further enter customer payment information 208 though interaction with the user device 202. Such payment information 208 can be communicated in a USSD message to an account-based server 210 that can apply the proper payment to the correct merchant account 212 and debit such amount from the customer account 214.

In further detail, a merchant of a user device 202 can initiate an account payment service session or mobile merchant session, by entering a short code or other information (similar to a telephone number or IP address), that is communicated to the MSC 206 through wired and/or wireless means. After initiation of the communication, the merchant can input authentication information 204, through interaction with an interface component 216, to authenticate such merchant as being allowed to utilize the mobile merchant service. Further information regarding the interface component 216 will be provided below. In some embodiments, the authentication information 204 can be voice identification or recognition technology, voice signature analysis, fingerprint identification, and so forth that can confirmation the proper person is initiating the transaction.

The authentication information 204 authenticates the merchant associated with user device 202 as an individual authorized to interact with MSC 206 and utilize the account-based server 210 to receive payment from a customer or refund a specific amount to a customer. The authentication information 204 might associate a particular individual with a particular company account if that individual is employed by such company, thus the merchant account 212 does not have to be a personal account. The authentication information can include a personal identification number (PIN) or other number, or other identification means. An unique number (e.g., telephone number) associated with the user device 202 may also be communicated at substantially the same time as the PIN.

For example, the user may input the telephone number directly though a numeric keypad, voice activation, or through other techniques. In some embodiments, the authentication information 204 can be automatically communicated to the MSC 206. Such authentication information 204 can be retained in a retrievable format in a storage media (not shown) associated with user device 202. For example, the merchant can send a request (by utilizing user device 202) to initiate a communication with MSC 206. Such communication can be initiated by the merchant entering a number, such as a telephone number or a short code (e.g., *PAY). The entered number would cause communication to be initiated with the MSC 206 and the authentication information 204 maintained in user device 202 can be sent to the MSC 206, without the merchant entering or submitting information. In some embodiments, the telephone number, or other identification associated with user device 202, can be automatically captured by the MSC 206 without requiring user input.

Storage media, as used herein can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The MSC 206 and/or account-based server 210 can be configured to determine whether the merchant is authorized to utilize the account-based payment service. Such determination can be made based on various criteria such as whether the merchant has access to the mobile merchant service. The access to the service might be based on whether the merchant has signed-up for such a service or accepted terms and conditions 218 relating to the service, such as by accessing a feature-code database 220. If the merchant has access to the service, a feature code 222 may be assigned to the particular device 202. The information regarding the user device 202 can be retained in the feature-code database 220 (which can be maintained by a USSD gateway or server). The information in the database 220 can be cross-referenced with the user device 202 information and/or authentication information 204 to determine which features are available. For example, the MSC 206 can communicate with a USSD gateway, such as through an HLR. The USSD gateway can perform a feature code check or other determination whether the merchant has access to the mobile merchant service. It should be understood that other means of determining if the device 202 has access to a particular service can be utilized with the one or more embodiments herein.

If access to the service is available, a determination can be made whether there is a valid account 212 (e.g., merchant account, company account) associated with the account-based server 210, which information can be maintained by an account database 224. The account database 224 can also maintain information that maps or associates a unique identifier (e.g., telephone number) of the user device 202 with a merchant account 212. The merchant account 212 can be credited and/or debited as payment information is processed. If the merchant does not have either a valid feature code 222 or account 212 associated with the mobile merchant service a SMS message can be sent direct the merchant to contact a customer service associate or is provided a URL of MSN 206, account-based server 210, or both, in order to gain access and use the features of the service. Such URL can be sent in an SMS message.

If the merchant has both the feature code 222 and the account 212, a menu (e.g., USSD menu) or various prompts can be presented to the user, through interface component 216 (e.g., a display, audibly, and so forth). Such menu or prompts can be provided by a USSD application that processes requests for the information. The menu or prompts can direct the merchant though a listing of items that should be gathered to process the account payment request. For example, the menu or prompts can request the user to enter payment information 208 though the interface component 216. The payment information 208 can include a credit card or debit card number (or other account number), an expiration date of the card, as well as other validation information (e.g., customer zip code). The menu or prompts can solicit further payment information 208 such as the amount of the transaction, whether the transaction is a payment or a refund, and so forth. The account-bases server 210 and/or account database 224 can verify whether there is a valid customer account 214.

Upon successful entry of accurate payment information 208, the merchant account 212 is credited and the customer account 214 is debited for a purchase. If there is a refund, the merchant account 212 is debited and the customer account is credited 214. The debits and/or credits may be applied to the respective account 212, 214 immediately or there may be a delay based on the operating procedure of the particular account holder (e.g., bank). The merchant can be presented with a transaction code or other means of identifying the transaction, which can be included in an SMS message. The SMS message should not include any customer information (e.g., credit card number). For example, the merchant can be presented with a confirmation code and a transaction amount. The merchant can manually write this confirmation code on a receipt presented to the customer. In some embodiments, the merchant or the MSC 206 can transmit the confirmation code or SMS message to the customer using a text message or other technique directly to a customer device (not shown). This real-time feedback can improve sales efficiency and increase successful sales closure rates. The SMS messages can be retained in the handset, downloaded to a memory device, and the like. The SMS messages can be manually or automatically deleted, such as after a predetermined interval.

The interface component 216 can provide a graphical user interface (GUI), a command line interface, a speech interface, Natural Language text interface, and the like. For example, a GUI can be rendered that provides a user with a region or means to load, import, select, read, etc. various prompts and/or menu selections, and can include a region to present the results of such prompts and/or menu selections. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key can be employed subsequent to entering the information in order to initiate information conveyance. However, it is to be appreciated that the disclosed embodiments are not so limited. For example, merely highlighting a check box can initiate information conveyance. In another example, a command line interface can be employed that can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 3:
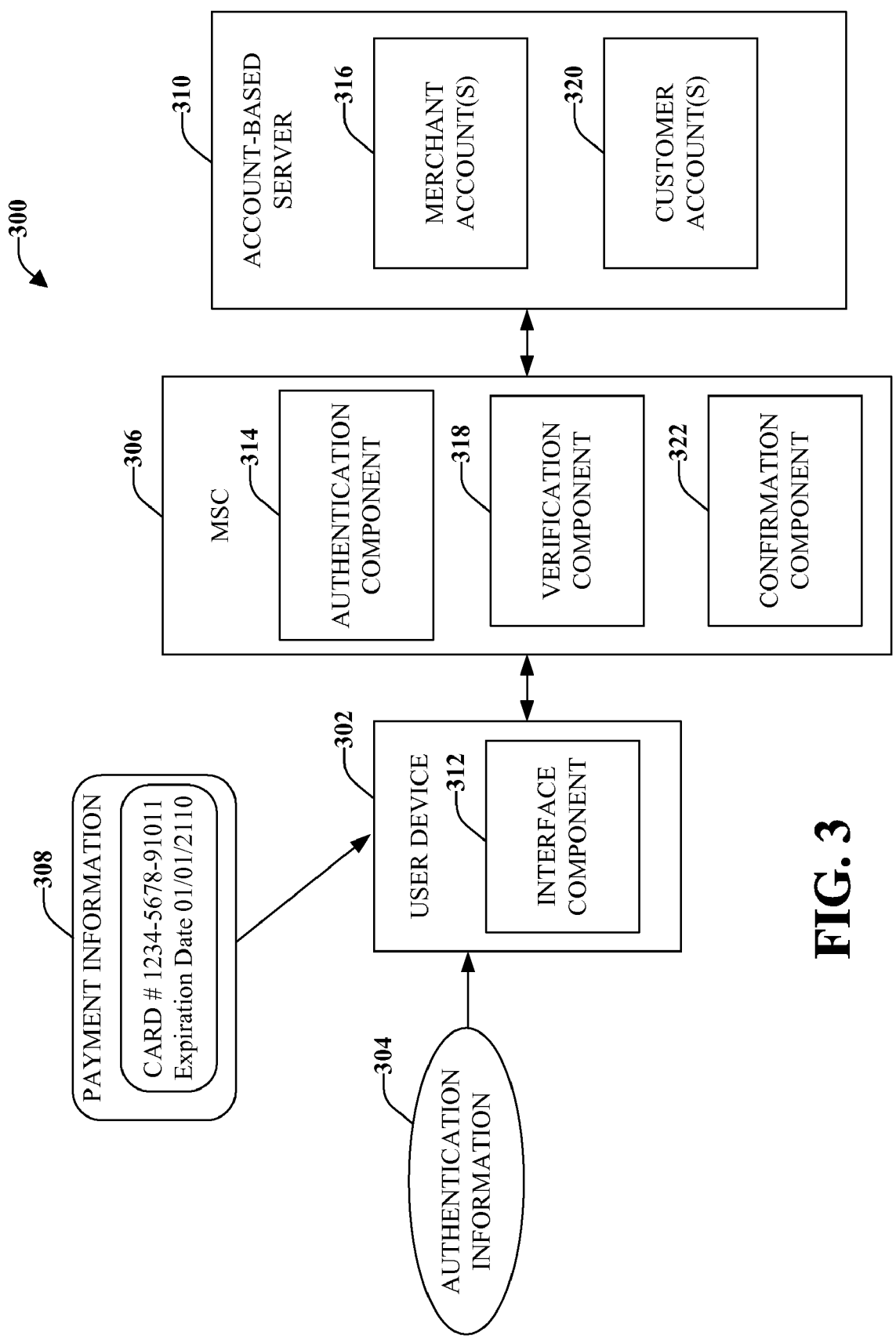
FIG. 3 illustrates a system that facilitates account transfer requests utilizing USSD technology.

FIG. 3 illustrates a system 300 that facilitates account transfer requests utilizing USSD technology. The USSD technology can offer a high-speed, session-oriented communication on a private channel. The USSD protocol allows a merchant to initiate a message and, provided communication is transmitted prior to expiration of a time-out interval (there is positive feedback from both sender and receiver), the messages communicated are attached to a single transaction. Since the transaction is session oriented, at substantially the same time as the transaction is completed, the confidential information regarding the customer account can be deleted (e.g., it is not maintained by a device used by the merchant). Multiple transaction can be conducted in a single session and they are attached to the session. Thus, there is a continuous session initiated and held open for the duration of the communication.

System 300 can include a user device 302 that can be configured to transmit authentication information 304, either autonomously or upon user request, to an MSC 306 servicing the user device 302. The authentication information 304 can be included in an USSD message and can include various types of information (e.g., authentication, feature code, merchant account, and so forth) relating to the user device 302. After initiation of a communication to access an account payment service or mobile merchant service, various types of payment information 308 can be transmitted to the MSC 306 and/or an account-based server 310. Such payment information 308 can be included in an USSD message. The user device 302 can include an interface component 312 that allows the merchant to input information (e.g., code to initiate the communication, authentication information 304, payment information 308, and so forth) and to present or display various menus, prompts and other information to the merchant.

The MSC 306 can include an authentication component 314 that can be configured to receive the entered authentication information 304 and determine whether the merchant (e.g., user device 302) is authorized to use a mobile merchant payment service, such as by accessing a feature code database. The authentication component 314 can further determine whether the merchant has a valid account (e.g., merchant account 316) associated with the account-based server 310. For example, the merchant can receive and/or accept various terms and conditions relating to processing and receipt of payments prior to the communication being initiated, such as by subscribing to a service. The merchant can also establish an account 316 in order to receive payments and/or issue credits. The authorization to use the service, the valid account, or both can be established before initiation of the communication. For example, the service and/or account can be established directly (e.g., in person, phone call, Internet, . . . ) with the respective service provider. In accordance with some embodiments, either or both the authorization to use the service and the valid account can be established at substantially the same time as the communication is initiated (e.g., the communication does not proceed until such terms and conditions are accepted or the account is established). For example, the authentication component 314 can determine that there is neither a feature code nor a merchant account associated with the user device and transmit a message that includes how to set up such features to the user device 302.

A verification component 318 can be configured to receive the payment information 308 and verify whether the payment information 308 corresponds with a valid customer account 320. For example, for a credit card payment, the payment information 308 can include a credit card account number, an expiration date, a transaction amount, a credit card verification value, and a customer zip code. The verification component 318 can communicate the payment information 308 to the account-based server 310 that can access the customer account 320 and can transmit verification about whether there is an account and if the payment information matches the account information and if the transaction amount can be processed.

In some embodiments, a customer can utilize an alias that allows such customer to purchase items using the alias and a secret PIN. The payment information 308 would include the alias and the customer can enter the secret PIN directly into the user device 302, without disclosing such information to the merchant. In some embodiments, the PIN can be received by utilizing an interactive voice response (IVR) system. The IVR system can call the customer on the customer's device. In this situation, the account-based server 310 would receive the USSD application request from MSC 306 and an IVR associated with the account-based server would call the customer to confirm the transaction. The customer can confirm by entering (e.g., by Dual Tone Multi-Frequency (DTMF)) their PIN. By using an alias, the customer does not have to share their credit card information (or other payment information) with the merchant. However, in this situation it requires the customer to have their mobile device available to complete the transaction.

If the payment information is processed successfully through the mobile merchant or account-based payment service, a confirmation component 322 can send a confirmation in a subsequent USSD message to the user (e.g., user device 302) indicating that the payment information has been processed (or if a payment has been voided, credited, or another transaction performed). The confirmation can include a confirmation code or other indicator that can be used to access the payment information, if needed in the future.

If the payment information is not processed successfully, the confirmation component 322 can notify the merchant of the unsuccessful processing of payment through the account-based payment service prior to completion of the transaction. In such a manner the merchant is provided an immediate, secure transaction that mitigates the risk of "fat finger" error (e.g., incorrectly collecting data for processing later), mitigates the risk of sale losses from customers who do not want their information manually collected, and mitigates the risk of accepting bad checks (e.g., those with insufficient funds) by offering credit cards or direct bank transfers that can be immediately verified.

Figure 4:
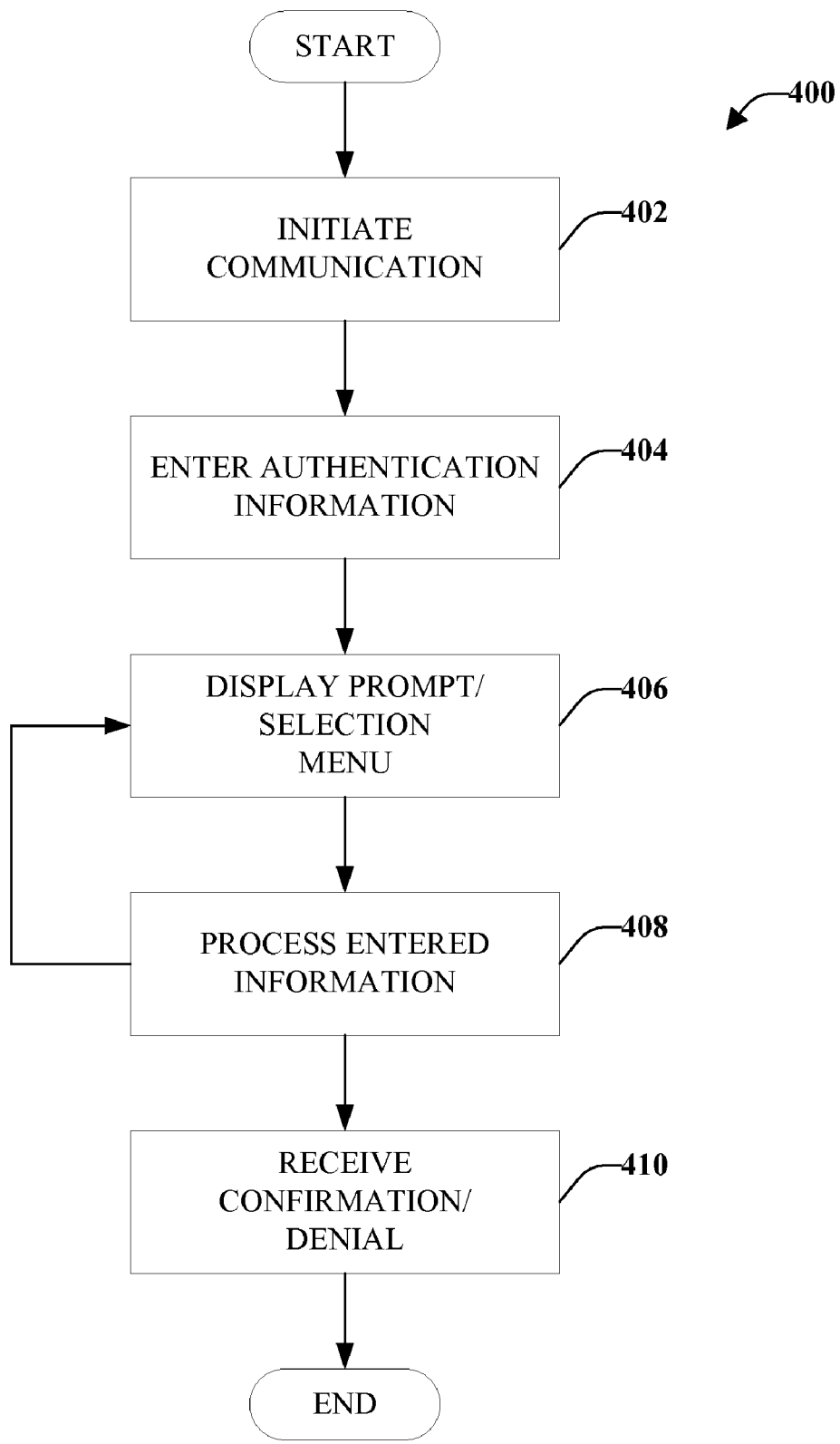
FIG. 4 illustrates a methodology for processing payment information utilizing USSD technology.

FIG. 4 illustrates a methodology 400 for processing payment information utilizing USSD technology. While, for purposes of simplicity of explanation, the methodologies are shown and described as a series of blocks, it is to be understood and appreciated that the disclosed embodiments are not limited by the number or order of blocks, as some blocks may occur in different orders and/or concurrently with other blocks from what is depicted and described herein. Moreover, all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 400 can facilitate processing of payments by merchants that might not normally accept credit card payments (e.g., merchants in the field) or those that use fee laden systems, usually requiring manually recording the payment information (e.g., credit card number) and processing the payment at a later time. Payment transactions include a payment, a refund, a void, and a request to view transactions.

Method 400 starts, at 402, when a communication is initiated with a mobile switching center (MSC), for example. Such communication can be initiated when a user or merchant enters information, such as a number or short code (e.g., *PAY#, #155*, or the like) or indicates that a communication should be initiated (e.g., voice command). The number or short code can automatically invoke a payment or mobile merchant service associated with the MSC. In some embodiments, the merchant can receive and/or accept various terms and conditions relating to processing and receipt of payments prior to the call being initiated, such as by subscribing to a service. In other embodiments, the merchant can receive and/or accept the terms and condition at substantially the same time as the call is initiated (e.g., the communication does not proceed until such terms and conditions are accepted).

At 404, authentication information is included in an USSD message (USSD command or USSD string of characters) and sent to a server or database (e.g., account-based server, subscriber server, or other server and/or database) to authenticate the user or merchant (e.g., user device) to facilitate processing and receipt of customer payments into a merchant account or to refund a customer from the merchant account. The authentication information can be sent autonomously or upon user request (e.g., manually). In some embodiments, the merchant may have a prior relationship with an account-based service. In other embodiments, the merchant can establish a relationship and receive authentication information at substantially the same time as the communication is initiated. For example, if the user device is not associated with a feature code and a merchant account, a USSD message can be received at the user device indicating that the user device could not be authenticated.

After the merchant or user device has been authenticated with the server, such as by receiving an authentication message, menu selections and/or prompts are presented to the merchant, at 406. Such prompts and/or menu selections can be USSD menu prompts that should be answered for each input of information necessary to verify the payment information. The prompts and/or menu selections can be displayed on a display screen, communicated audibly or through another communication means. Such menu selections can be presented to the merchant based on prompts received from an account-based server, subscriber server, or other server facilitating processing of payment information. Such menu selections can include a type of transaction (e.g., purchase, refund, void transaction, view transactions), amount of transaction, payment method (e.g., credit card, debit card, account transfer, and the like), payment information (e.g., credit/debit card number, expiration date, verification number, card verification value, and so forth). Other menu selections and/or prompts can include other payment verification information, such as purchaser's zip code information, telephone number information, or other verification information needed by the account-based server to proceed with the payment transaction.

The prompts and/or menu selections can be presented to the user individually or at substantially the same time as a response to a previous menu selection and/or prompt is answered (e.g., entered by the merchant), the information is transmitted to the server, at 408, in an USSD message. The method 400 can present a next prompt and/or menu selection to the merchant, at 406, if additional information is necessary. It is to be understood that this act can be recursive such that any number of menu selections and/or prompts can be presented for information. Moreover, it is to be appreciated that automated and/or dynamic requests for information can be employed in connection with alternate aspects if a previous entry is incorrect or does not match database information. For example, the system can be configured to automatically request additional and/or alternative information dynamically in accordance with an incorrect or inconclusive response to a previous prompt and/or selection.

At 410, confirmation or denial of the transaction is received. If a confirmation is received, it indicates that the information relating to the payment transaction matches customer account information maintained by the server or database and that sufficient funds are available to process the payment. Information regarding the transaction can be presented to the user, such as a transaction confirmation number, date of transaction, amount of transaction, and other information that can be utilized by the merchant to track the transaction. If the transaction is denied, it indicates that the information received regarding the customer account information is incorrect, could not be verified, there are insufficient funds to process the request, and so forth.

In accordance with some embodiments, the merchant can be presented with complete online access to their account. Such access can include receiving and being presented with complete account history. Activity details and/or disputed reports can be downloaded or saved in various formats (e.g., Quicken, QuickBooks, comma delimited, tab delimited). A transaction can be voided or reversed within a predetermined time period after the initial transaction or at any time after the transaction. Funds can be transferred between merchant accounts, if the merchant has more than one account, or between the merchant account and another account.

Figure 5:
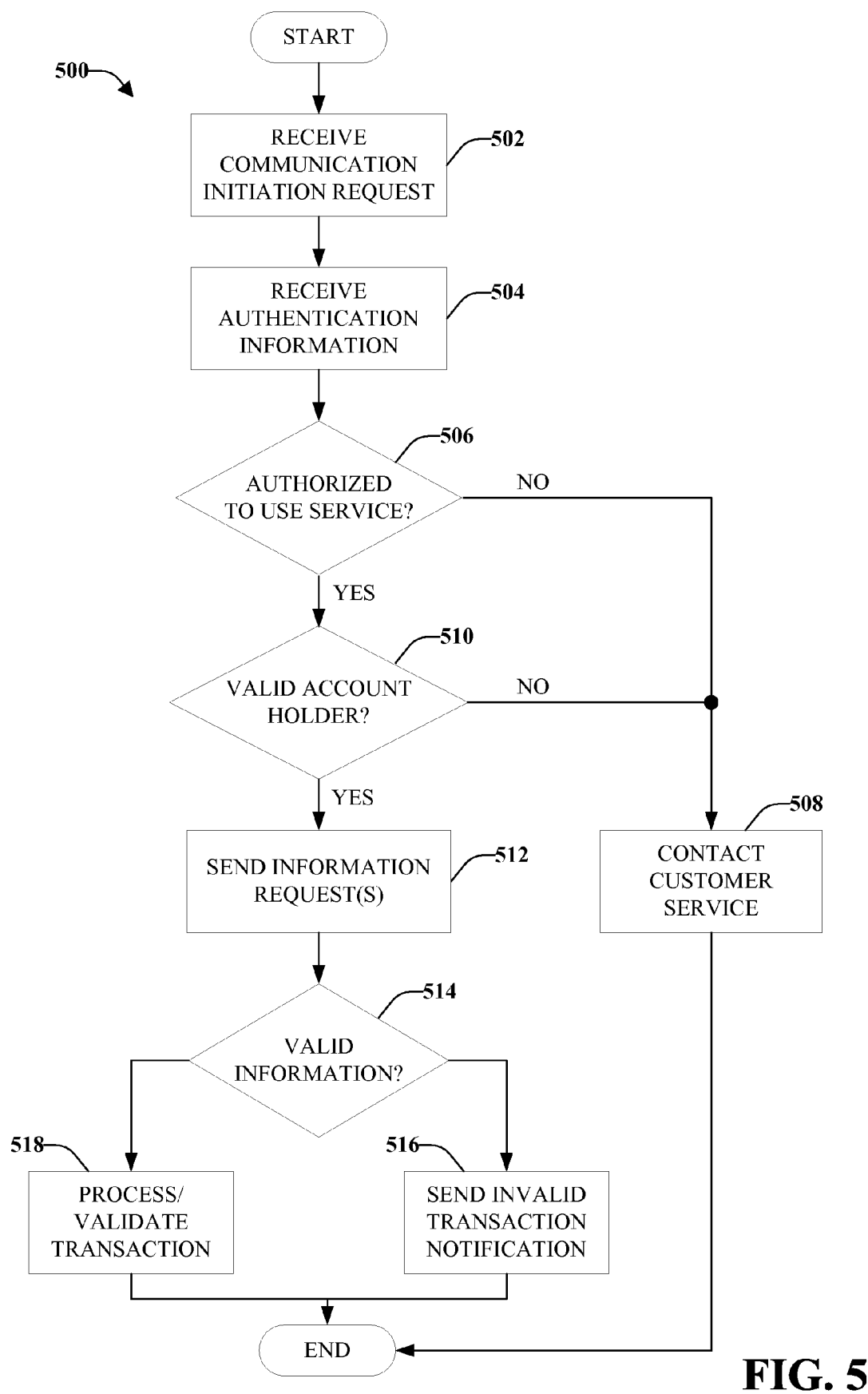
FIG. 5 illustrates a methodology for processing payment information.

FIG. 5 illustrates a methodology 500 for processing payment information. Method 500 can be configured to selectively determine whether a merchant is authorized to use a mobile merchant service (e.g., purchase, refund, void, transaction history). Method 500 can further selectively determine whether valid information is available to process payment (or issue credit) from a customer account. The information regarding the status of the payment transaction can be communicated to the merchant at substantially the same time as the information is received. Thus, payments are received in a timely and secure manner.

Method 500 starts, at 502, where communication call initiation request is received. The communication initiation request can be received from a merchant utilizing a user device. A response to the communication request (not shown) can include a call acceptance. At 504, authentication information is received. The authentication information can relate to the merchant (e.g., associated with a user device) and can include a PIN number, a user device number (e.g., telephone number) or other merchant identification information. The authentication information can be received in a USSD message.

At 506, a determination is made whether the user device (e.g., merchant) associated with the authentication information is authorized to utilize a payment processing service (e.g., mobile merchant). Such determination can be made based on information included in the authentication information received, such as whether the merchant has accepted various terms and conditions relating to the service or based on other criteria. For example, a feature code database that includes features codes associated with various user devices can be accessed to determine if a particular user device has access to the service (e.g., there is a feature code associated with the user device). If the user is not authorized to use the service ("NO"), the method 500 continues, at 508, where a notification (which can be included in an SMS message) is presented to the merchant indicating that the merchant should contact a customer service associate to continue. In some embodiments, the merchant can be automatically transferred to a customer service associate.

If the determination, at 506, is that the merchant is authorized to use the service ("YES"), the method 500 continues, at 510, where a determination is made whether the merchant is a valid account holder. The merchant should be a valid account holder in order for the customer payment to be applied to the merchant's account and/or the credit to be removed from the merchant's account. If the merchant is not a valid account holder ("NO"), a notification is presented to the merchant, at 508, indicating that the merchant should set up an account. For example, an SMS message can be sent that includes an URL address associated with an account-based server. In some embodiments, the merchant may be automatically connected with a customer service representative to set up the account.

If the determination is that the merchant is a valid account holder ("YES"), at 512, information requests are selectively sent to prompt the merchant for information associated with the transaction. The prompts can be USSD menu selections (e.g., process payment, credit a payment, void a transaction, view recent transactions, and so forth). At substantially the same time as a response to an information request is received, a subsequent request for information can be sent. Such subsequent requests can be sent up to a predetermined number of payment information responses are received. The predetermine number of responses can relate to information necessary to verify that payment is being made from (or credited to) an authorized customer account.

After the responses are received in respective USSD messages, a determination is made, at 514, whether the payment information is valid or corresponds to information retained in an account database. For example, a determination can be made whether a credit card number matches an expiration date and a customer zip code. If it is determined that the information is not valid ("NO"), a invalid transaction notification is sent, at 516. In some embodiments, the payment information can be sent to an account-based server that verifies the account and replies with a notification that indicates whether the payment information does or does not match a valid customer account.

In some embodiments, the payment information can include receiving a customer alias in response to the requested payment information. The alias allows a customer to purchase items using the alias and a secret PIN. An interactive voice response system can send a request for the PIN directly to the customer. The customer can respond with the number to verify the information.

If it is determined, at 514, that valid information has been received ("YES"). The transaction is validated and the payment (or credit) is processed. A confirmation code and transaction amount can be sent to the merchant to complete the transaction. For example, a USSD termination message can be sent and then a subsequent SMS message can be sent. The SMS message can be stored on a user device that includes a confirmation code and an account detail (e.g., transaction amount, date, and so forth). In some embodiments, the transaction history can be accessed though a website associated with the account-based server. An option to perform another transaction on the same customer account, a different customer account, or a different type of transaction can be presented to the merchant.

Figure 6:
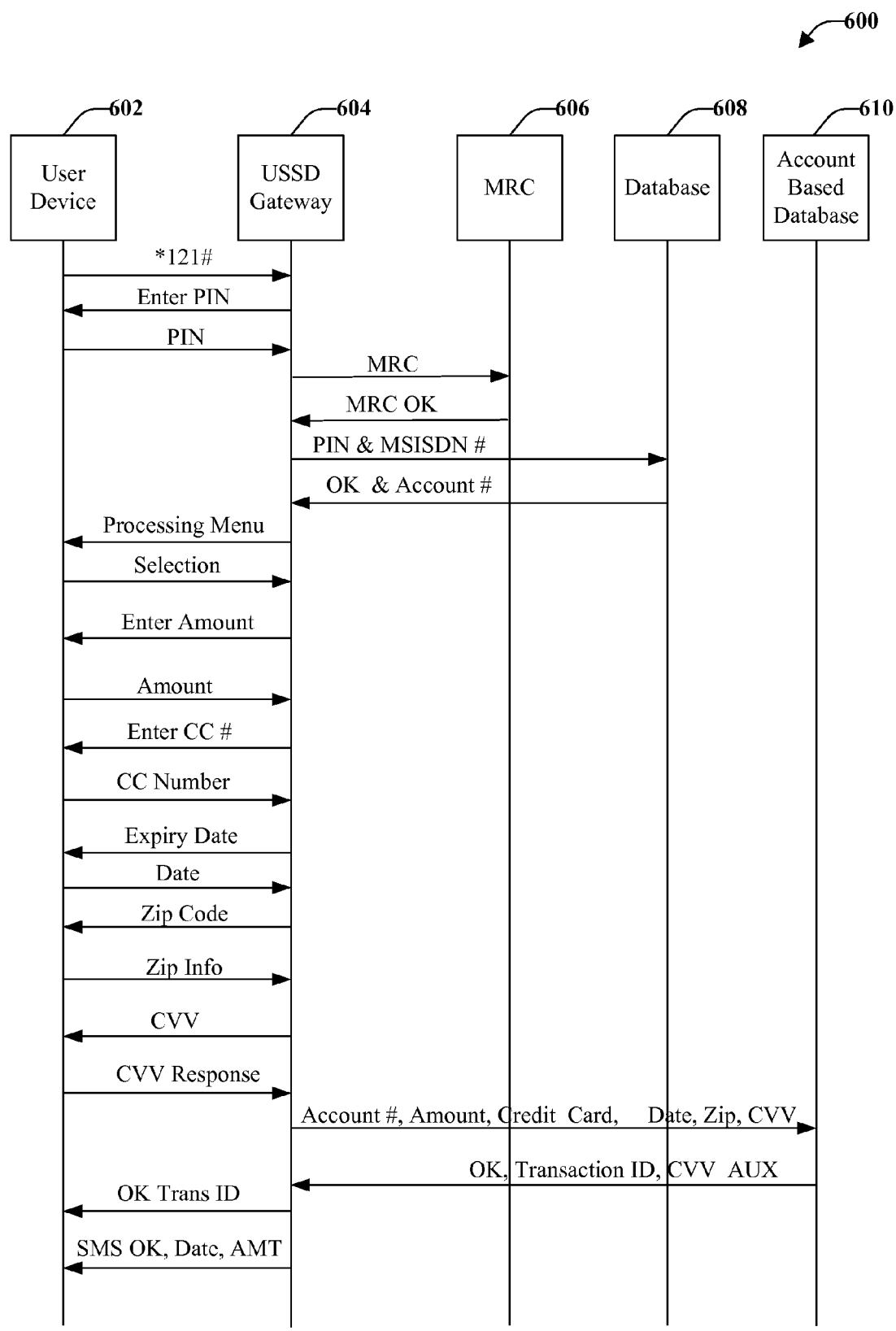
FIG. 6 illustrates an exemplary mobile merchant processing flow.

With reference now to FIG. 6, illustrated is an exemplary mobile merchant processing flow 600. A communication is initiated from a user device 602, such as by entering a short code (e.g., *121#). However, it should be understood that the communication can be initiated utilizing a different code, number, or technique. The communication initiation request is received at a USSD Gateway 604, that can respond with a request for information that authenticates the user device 602 (e.g., "enter PIN"). The request can be displayed on a display screen of the user device 602, or it can be presented to the user as an audible request, or through another technique. The PIN or other authentication information can be entered using a keypad of user device 602, through voice recognition, or through another means that can interpret and send the information in a format understandable by the USSD Gateway 604.

The USSD Gateway 604 can send a communication request ("MRC") to an MRC 606, which can respond with an indication to proceed with the communication ("MRC OK"). A PIN and a unique number associated with the user device 602 can be sent to a database 608, such as an MRC database, to determine if the user device 602 is authorized to use a mobile merchant service. Such determination can be made based on whether a feature code or Monthly Recurring Charge is available for (e.g., assigned) that user device 602. For example, the feature code and/or Monthly Recurring Charge can be cross-referenced with the PIN and unique number associated with the user device. If the user device 602 is authorized to use the service, database 608 replies to the USSD gateway 604 with a confirmation. If the user device 602 is not authorized, database 608 can respond with an error message or other message indicating that the transaction cannot proceed.

Upon receipt of the confirmation, USSD gateway 604 can request various types of information that relate to processing the payment, credit or other transaction. Such requests can be presented in the form of a processing menu that can be displayed on the user device. However, it should be understood that other techniques of facilitating communication of the payment information can be utilized with the disclosed embodiments. The type of transaction (e.g., payment, refund, and so forth) can be selected and the USSD Gateway 604 can prompt for further information such as the amount of the transaction, a credit card number, expiration date, zip code, credit verification value, and so forth. Responses to each request can be sent from the user device 602 to the USSD Gateway 604. Such response may be received before a next request for information is sent.

Once the necessary data is collected, the USSD Gateway 604 communicates the information to an Account-Based Database 610. The information received can be verified by the account-based database 610 to ensure that the information matches a valid account. If valid, a confirmation is sent to the USSD Gateway 604 to proceed with the transaction. The USSD Gateway 604 can send a confirmation and a transaction identifier to the user device 602. A terminating USSD message can be sent at substantially the same time as an SMS message that includes an authorization code, date of transaction, amount of transaction, and/or other information relating to the processed transaction is sent. The SMS message can be retained in storage media associated with the user device 602.

If the account was not verified by the account based database 610, an error message or other message can be sent to the USSD Gateway 604. The user device 602 can be notified that the entered information was incorrect, that there are insufficient funds to process the transaction or that the transaction can not be completed based on other factors. In such a manner, the merchant receives real-time communication regarding the transaction and can mitigate non-payment if the customer payment is not processed. For example, the merchant can notify the customer that the payment was not authorized. The customer can decide to use another form of payment and/or the merchant/customer can decide to not proceed with the transaction.

Figure 7:
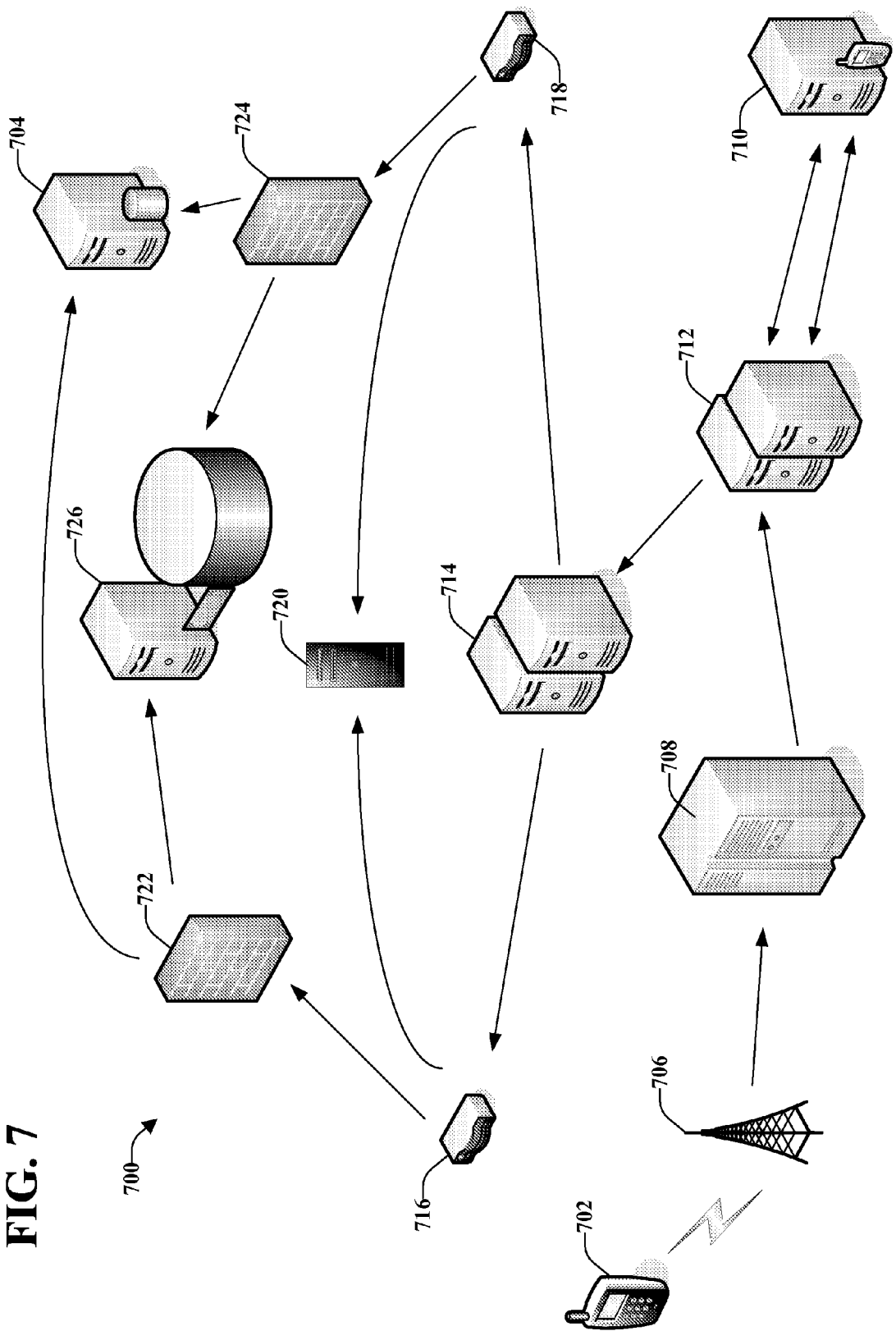
FIG. 7 illustrates an exemplary message flow for an USSD request in accordance with the embodiments disclosed herein.

FIG. 7 illustrates an exemplary message flow 700 for a USSD request in accordance with the embodiments disclosed herein. A merchant can initiate a communication to process a customer payment, issue a refund to a customer, view recent transactions and so forth without requiring extra hardware or special client software. A merchant, utilizing user device 702, can enter a string of numbers, letters, symbols, or a combination of numbers, letters, and symbols to contact an account-based database 704. For example, the merchant can initiate the communication by entering *122# or *PAY# or another USSD access code requesting initiation of a mobile merchant payment service. It should be understood that although the user device 702 shown is a cellular phone, other user devices can be utilized with the disclosed embodiments.

The communication can be routed through a base station or access point 706 serving a cell site that services the geographic area where the user device 702 is located. The message can be transported to a MSC 708 serving the user device 702. The serving MSC 708 sends the USSD message to a home location register (HLR) 710 through a signaling transfer point pair 712. The HLR is the functional unit responsible for managing mobile subscribers. The STP pair 712 forwards the USSD message to the HLR 710, which can be identified based on a point-code translation table. The HLR 710 can forward the message, as identified by an access code, to a USSD server located off the gateway STP pair 712. The STP pair 712 can forward the message to a STP regional pair 714.

The STP regional pair 714 forwards the message to each of two redundant USSD servers 716 and 718. Each USSD server 716, 718 can query an enterprise directory 720 to determine whether the user device 702 has registered for the mobile merchant payment service. Such a determination can be made based upon a feature code assigned to the user device 702, which may be assigned when the merchant agrees to various terms and conditions relating to the service or based on other criteria. If the user device 702 is not registered or does not have a feature code assigned, an error message can be returned to the user device 702. The error message can be included in an SMS message that can include information regarding how to register and receive the service. If the user is registered and can access the service, each USSD server 716, 718 generates an account-based IP request and forwards such request over the air, such as over the Internet 722, 724.

Each USSD server 716, 718 can query an external database 704 for an account-based customer number to authenticate the user device 702 to receive payments, issue credits, and perform other transactions with the account based service 726. After authentication, the IP request can be forwarded to an account-based service 726. The account-based service 726 can process the request and provide information regarding identification of the transaction for later purposes. Information can be communicated to the user device 702 from the enterprise directory 720, account based service 726 or other devices through which the message flow 700 is routed in a reverse order than that shown and described. Thus, there is bi-directional communication among the devices.

Figure 8:
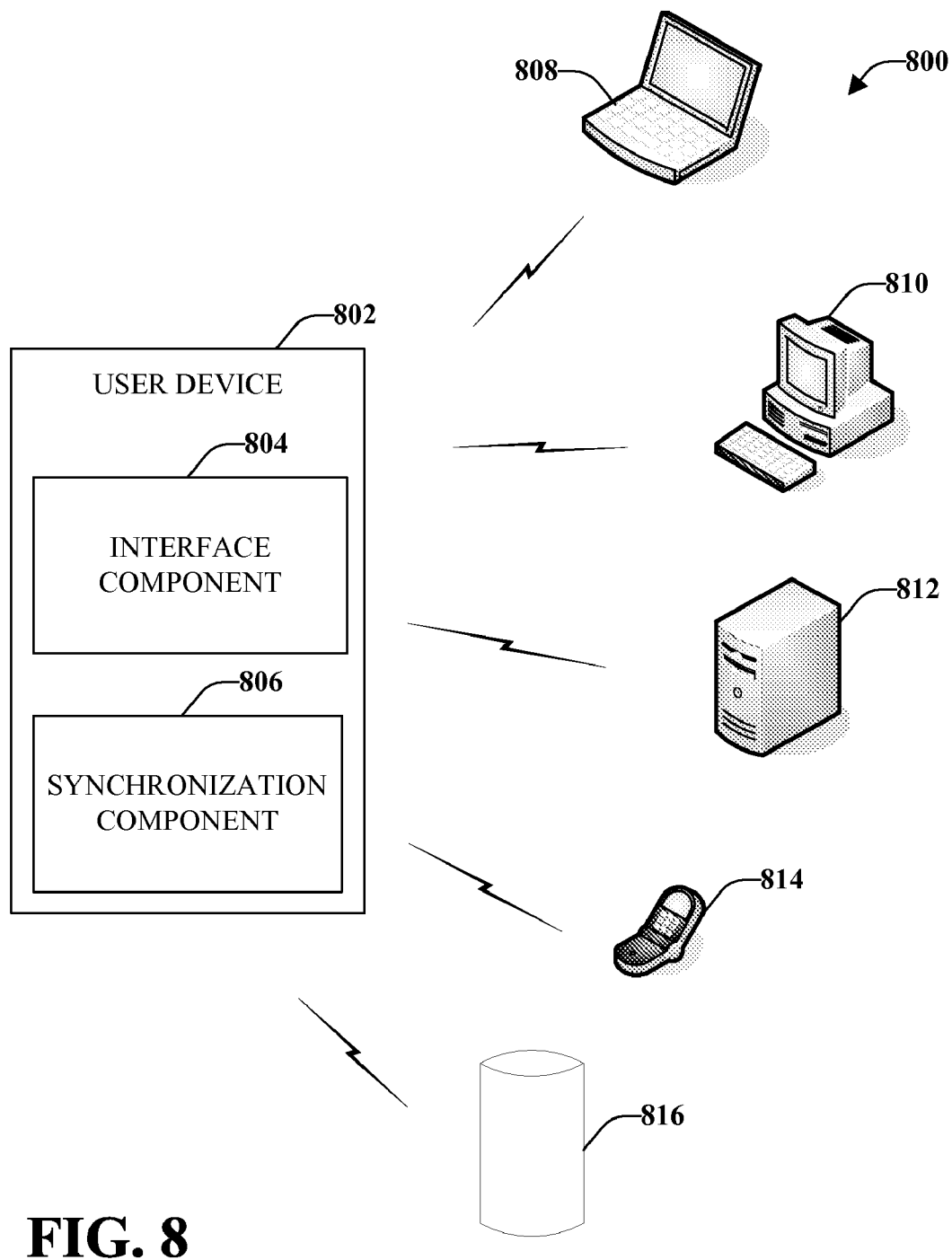
FIG. 8 illustrates a system for synchronizing mobile merchant transactions in accordance with the one or more embodiments.

With reference now to FIG. 8, illustrated is a system 800 for synchronizing mobile merchant transactions in accordance with the one or more embodiments. System 800 can facilitate synchronization of customer payments, credits, and other transactions between a user device and another device or system. The synchronization can be process through various communication technologies such as Bluetooth, IR, WiFi, Radio Frequency Identify (RFID), Universal Serial Bus (USB), and so forth.

Included in system 800 is a user device 802 that includes an interface component 804 for entering customer payment (and other transaction) information and presenting the results of such entered transactions. Interface component 804 can be configured to visually display menu selections, prompts, and transaction information. Alternatively or in addition, interface component 804 can be configured to present such items audibly or other forms, or any combination thereof, to facilitate information conveyance.

User device 802 can also include a synchronization component 806 that can be configured to convey information between user device 802 and one or more other devices. Such devices include, but are not limited to, a laptop computer 808, a desktop computer 810, a server 812, a mobile phone 814, and/or a database 816. It should be understood that the information exchange between the user device 802 and the one or more other devices 808, 810, 812, 814, and 816 can be through wireless or wired means.

For example, a merchant may be performing sales transactions at a location remote from an office. When the merchant returns to the office, the transactions for a given time period or since a last synchronization, can be compiled and communicated to another device. The one or more other devices 808, 810, 812, 814, and 816 can retain such transaction information in a retrievable format. Alternatively or in addition, the synchronized transactions can be reconciled with a number of products sold, services performed, etc. The synchronized transactions may also be utilized to provide a commission or other form of payment to the merchant.

Figure 9:
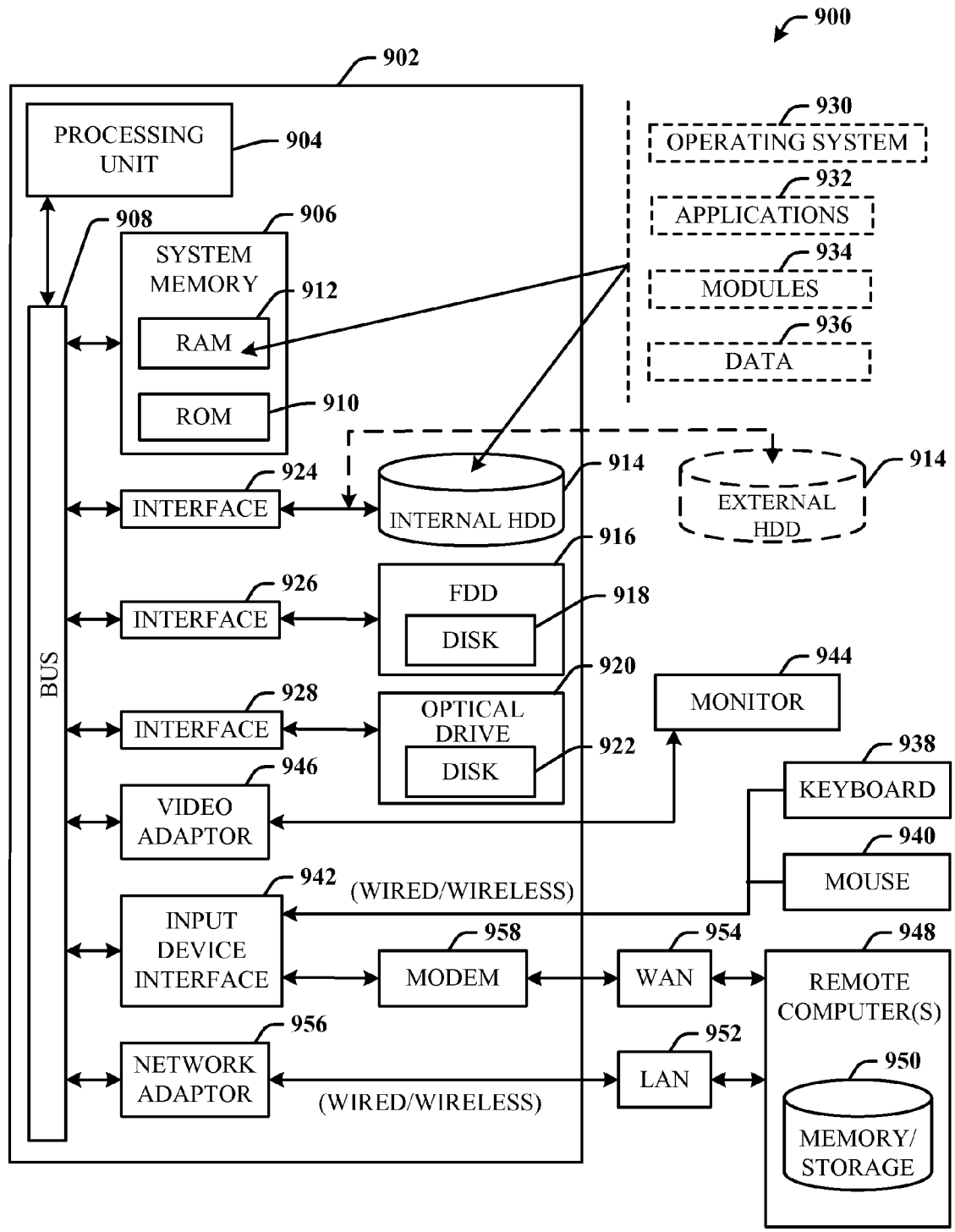
FIG. 9 illustrates an exemplary computing environment that can be employed in connection with various aspects described herein.

Referring now to FIG. 9, there is illustrated a block diagram of a computer operable to aid in provisioning of dual mode services as described above. In order to provide additional context for various aspects of the claimed subject matter, FIG. 9 and the following discussion are intended to provide a brief, general description of a suitable computing environment 900 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various embodiments can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from home, in a hotel room, or at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
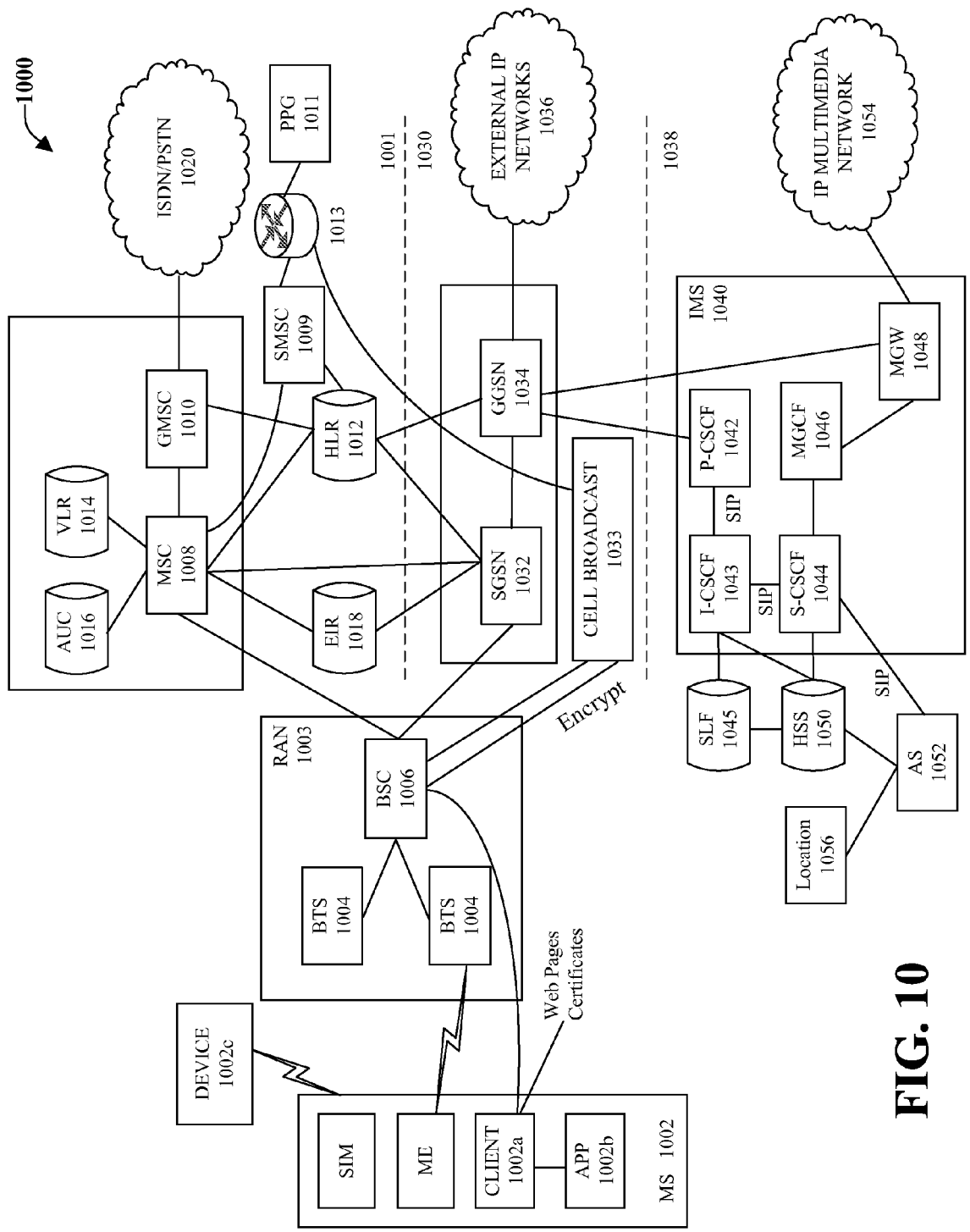
FIG. 10 illustrates an exemplary networking environment.

Now turning to FIG. 10, illustrated is a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber Identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a may be implemented in JAVA and is discuss more fully below.

The embedded client 1002a communicates with an application 1002b that provides services and/or information to an end user. One example of the application may be mobile merchant software that provides real-time payment transaction information that is received by the embedded client 1002a to the end user. The mobile merchant software may provide availability of a mobile merchant service, status or confirmation of a payment transaction, etc. based on information received from the MS 1002.

Alternatively, the MS 1002 and a device 1002c may be enabled to communicate through a short-range wireless communication link, such as BLUETOOTH. For example, a BLUETOOTH SIM Access Profile may be provided in an automobile (e.g., device 1002c) that communicates with the SIM in the MS 1002 to enable the automobile's communications system to pull information from the MS 1002. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1002c. There may be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1016, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, through the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSSs 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the disclosed embodiments. It is, of course, not possible to describe every conceivable combination of components or methodologies for purposes of describing the embodiments, but one of ordinary skill in the art may recognize that many further combinations and permutations of such matter are possible. Accordingly, the embodiments are intended to embrace all such alterations, modifications and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for wirelessly processing payment transactions, comprising:
    receiving authentication information associated with a mobile device associated with a merchant, the authentication information is received in a first unstructured supplementary service data (USSD) message;
    determining if the mobile device is authorized to process payment transactions based in part on the received authentication information;
    selectively requesting payment information from the mobile device, the payment information request is contained in a second USSD message;
    receiving in a third USSD message the requested payment information;
    verifying if the received payment information matches information in an account database; and
    sending a short message service (SMS) termination message that includes a verification if the received payment information matches information in the account database.

2. The method of claim 1, the determining if the mobile device is authorized to process the payment transactions comprising:
    accessing a feature code database that contains information relating to available feature codes; and
    matching the received authentication information to one or more feature codes contained in the feature code database.

3. The method of claim 2, further comprising sending an SMS message to the mobile device if the received authentication information does not match the one or more feature codes maintained in the feature code database.

4. The method of claim 1, the selectively requesting the payment information from the mobile device comprising:
   sending a menu selection with the second USSD message;
   receiving a response to the sent menu selection; and
   sending a subsequent USSD message that includes a prompt for subsequent payment information until a predetermined number of payment information responses are received.

5. The method of claim 1, the verifying if the received payment information matches the information in an account database comprising:
   sending the payment information to an account-based server; and
   receiving notification whether the payment information matches a valid customer account or does not match a valid customer account.

6. The method of claim 1, after the determining if the mobile device is authorized to process the payment transactions based in part on the received authentication information, further comprising:
   determining if there is a valid merchant account associated with the mobile device; and
   sending an SMS message that includes a uniform resource locator (URL) address associated with an account-based server if it is determined that there is not a valid merchant account associated with the mobile user device.

7. The method of claim 1, the payment transactions include at least one of a purchase, a refund, a void or a transaction history.

8. The method of claim 1, the sending the SMS termination message further comprising sending a confirmation code and at least one transaction detail.

9. The method of claim 1, after the selectively requesting the payment information from the mobile device:
   receiving a customer alias in response to the requested payment information;
   sending an interactive voice response system request to the customer for a personal identification number (PIN); and
   receiving the PIN in response to the sent interactive voice response system request.

10. A wireless communications system that facilitates payment transfer utilizing a mobile device, comprising:
   an authentication component that receives in a first unstructured supplementary service data (USSD) message authentication information associated with a mobile device and determines whether the mobile device is authorized to access an account-based payment service, the mobile device is associated with a merchant;
   a verification component that receives payment information included in a second USSD message and verifies whether the payment information corresponds with a valid customer account; and
   a confirmation component that transmits to the mobile device a confirmation included in a third USSD message that confirms whether the payment information has been processed through the account-based payment service.

11. The system of claim 10, further comprising a feature code database that retains information relating to whether the mobile device is authorized to use the account-based payment service.

12. The system of claim 10, the authentication component further determines whether there is a merchant account associated with the mobile device based in part on the authentication information.

13. The system of claim 10, the confirmation component sends an invalid transaction notification if the payment information has not been processed through the account-based payment service.

14. The system of claim 10 the authentication component transmits a message to the mobile device if the mobile device is not associated with a feature code and a merchant account.

* * * * *